(12) United States Patent
Hayashi (10) Patent No.: US 7,783,324 B2
(45) Date of Patent: Aug. 24, 2010

(54) MOBILE COMMUNICATION SYSTEM AND DEVICES USED THEREFOR

(75) Inventor: Keiichi Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1249 days.

(21) Appl. No.: 11/281,507

(22) Filed: Nov. 18, 2005

(65) Prior Publication Data

US 2006/0121942 A1    Jun. 8, 2006

(30) Foreign Application Priority Data

Dec. 7, 2004    (JP) .............................. 2004-353538

(51) Int. Cl.
*H04M 1/00* (2006.01)
(52) U.S. Cl. ................................. 455/556.1
(58) Field of Classification Search ............... 455/556.1
See application file for complete search history.

(56) References Cited

U.S. PATENT DOCUMENTS

| | | | |
|---|---|---|---|
| 5,303,291 A | 4/1994 | Takagi et al. | |
| 5,335,273 A | 8/1994 | Takagi et al. | |
| 6,751,088 B2 | 6/2004 | Kato | |
| 6,944,782 B2 * | 9/2005 | von Mueller et al. | 713/320 |
| 7,095,986 B2 * | 8/2006 | Mager | 455/90.3 |
| 7,197,347 B2 * | 3/2007 | Chen | 455/575.8 |
| 2001/0041593 A1 * | 11/2001 | Asada | 455/558 |

FOREIGN PATENT DOCUMENTS

| | | |
|---|---|---|
| JP | 4-117848 | 4/1992 |
| JP | 2002-279102 (A) | 9/2002 |
| JP | 2002-330204 (A) | 11/2002 |
| JP | 2004-102826 A | 4/2004 |
| JP | 2004-102826 (A) | 4/2004 |
| JP | 2004-221860 A | 8/2004 |
| JP | 2004-221860 (A) | 8/2004 |
| JP | 2004-320121 A | 11/2004 |

* cited by examiner

*Primary Examiner*—Ajit Patel
(74) *Attorney, Agent, or Firm*—Foley & Lardner LLP (57) ABSTRACT

Disclosed is an attached body detachably attached to a mobile communication terminal main body. The attached body includes a storage unit for storing an attached body identification number, content data, and access information showing an access destination of auxiliary information to utilize said content data in the mobile communication terminal. The attached body further includes a communication unit for transmitting the attached body identification number, the access information and the content data to the mobile communication terminal main body in accordance with demands from the mobile communication terminal main body.

14 Claims, 10 Drawing Sheets

| PANEL IDENTIFICATION NUMBER | KEY INFORMATION | KEY INFORMATION ACQUISITION HISTORY | TERMINAL IDENTIFICATION INFORMATION | CONTENT INFORMATION |
|---|---|---|---|---|
| 00000000 | KEY INFORMATION 0 | 0 | – | CONTENT INFORMATION 1 |
| 00000001 | KEY INFORMATION 1 | 0 | – | CONTENT INFORMATION 1 |
| 00000002 | KEY INFORMATION 2 | 0 | – | CONTENT INFORMATION 1 |
| 00000003 | KEY INFORMATION 3 | 1 | 11111111111 | CONTENT INFORMATION 1 |
| 00000004 | KEY INFORMATION 4 | 2 | 22222222222 | CONTENT INFORMATION 1 |
| 00000005 | KEY INFORMATION 5 | 3 | 33333333333 | CONTENT INFORMATION 1 |
| 00000006 | KEY INFORMATION 6 | 1 | 44444444444 | CONTENT INFORMATION 1 |
| 00000007 | KEY INFORMATION 7 | 1 | 11111111123 | CONTENT INFORMATION 1 |
| ⋮ | ⋮ | ⋮ | ⋮ | ⋮ |
| 99999997 | KEY INFORMATION 99999997 | 0 | – | CONTENT INFORMATION 1 |
| 99999998 | KEY INFORMATION 99999998 | 0 | – | CONTENT INFORMATION 1 |
| 99999999 | KEY INFORMATION 99999999 | 0 | – | CONTENT INFORMATION 1 |

FIG.3A

| CONTENTINFORMATION 1 | STORED OR NOT |
|---|---|
| STANDBY DISPLAY | O |
| VOICE TELEPHONE DIALING DISPLAY | × |
| VOICE TELEPHONE INCOMING DISPLAY | × |
| TV TELEPHONE DIALING DISPLAY | × |
| TV TELEPHONE INCOMING DISPLAY | × |
| DURING MAIL TRANSMITTING DISPLAY | × |
| MAIL RECEIVING DISPLAY | × |
| ALARM NOTIFICATION DISPLAY | × |
| STILL PICTURE EDIT FRAME IMAGE | O |
| STILL PICTURE EDIT STAMP | O |
| INCOMING MELODY | O |
| INCOMING NOTIFICATION MUSIC DATA | O |

MOBILE COMMUNICATION SYSTEM AND DEVICES USED THEREFOR

BACKGROUND OF THE INVENTION

1. Field of the Invention

The present invention relates to a mobile communication system including a mobile communication terminal having an attached body that can be attachably and detachably attached to its main body, and devices used therefore. Particularly, the present invention relates to a mobile communication system in which it is possible to obtain various content data by exchanging attached bodies, and devices used therefore.

2. Description of the Related Art

Some types of mobile communication terminals such as mobile phone may attach an exchangeable panel for decoration to a part corresponding to the backside (exterior) of a liquid crystal display unit thereof. Manufacturers prepare such panels or attached bodies in a wide variety of types as options.

Japanese Patent Application Laid-Open No. HEI 4-117848 (1992) (document 1) has disclosed a mobile phone equipped with a protective cover for protecting the operation units such as ten-key board. In the case of the mobile phone described in this document, a function module that provides a function not provided by the mobile phone main body (for example, as a calculator, watch) is mounted on a protective cover, and the protective cover is made attachable to the main body. The technique described in document 1 provides the function not provided for the main body but provided for the protective cover.

Further, Japanese Patent Application Laid-Open No. 2004-221860 (document 2) has disclosed the use of an attached body in order to facilitate selection/setting of functions that a mobile terminal main body provides. An attached body described in document 2 holds identification information for identifying the attached body. When an attached body is attached, the mobile terminal main body reads the identification number of the attached body. Then, the mobile phone main body sets a functional operation mode specified by the identification number for itself. Thus, it is possible for a user to easily select/set a desired function provided to the main body without performing troublesome menu operation and button operation. Furthermore, since the contents of the function setting are indicated on the surface of the attached body, the user can learn the contents of the function setting immediately from its external appearance side.

However, these techniques only decorate the exterior of a mobile phone, protect the keypad, enable operation of a specific function by setting a key on the panel, or cause to set a specific function in accordance with the panel. Further, the mobile phone shown in document 2 only identifies the type of a panel and causes to set in accordance with the attached panel by combining the type of the panel and an arbitrary function. Furthermore, it is possible for the panel described in document 2 to perform the function even if it is attached to another mobile phone of the same type. Therefore, a person other than the purchaser of the panel such as one who has received the panel illegally or one who has duplicated the data stored in the panel to another panel can use the data stored in the panel. Because of this, for example, it is difficult for a person or company having the copyright of the music, picture data, etc., stored in the panel to avoid the risk of the unauthorized use of the works.

SUMMARY OF THE INVENTION

The first exemplary feature of the present invention is to provide a mobile communication terminal, its main body, and attached bodies, with which it is possible for the authorized user to obtain new and various pieces of information and data only by exchanging the attached bodies.

According to the first exemplary aspect of the present invention, there is provided an attached body detachably attached to a mobile communication terminal main body. The attached body includes a storage unit for storing an attached body identification number, content data, and access information showing an access destination of auxiliary information to utilize said content data in the mobile communication terminal. The attached body further includes a communication unit for transmitting the attached body identification number, the access information and the content data to the mobile communication terminal main body in accordance with demands from the mobile communication terminal main body.

The first exemplary aspect of the present invention makes it possible to easily change various contents used in a mobile communication terminal by exchanging attached bodies. According to the first exemplary aspect of the present invention, acquisition of auxiliary information is indispensable for the use of contents and the auxiliary information demands an attached body identification number for identifying the attached body itself, therefore, by managing the attached body identification number and the content user in pairs, there is provided considerably contributing means to prevention of illegal use.

Other features and aspects of the present invention will be clarified in the description of preferred embodiments.

DETAILED DESCRIPTION OF THE PREFERRED EMBODIMENTS

A mobile communication terminal according to an embodiment of the present invention will be explained below with reference to drawings.

Figure 1:
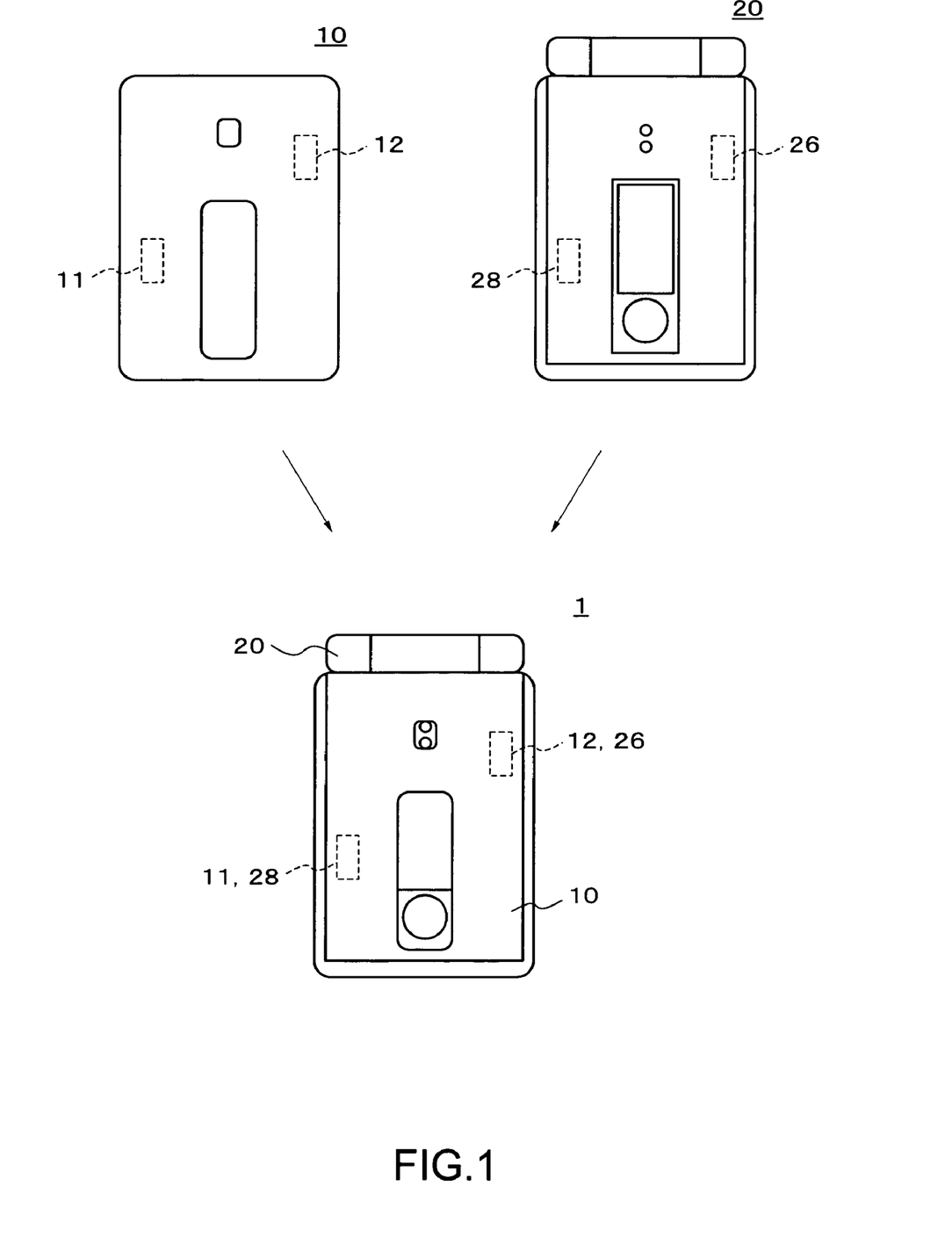
FIG. 1 is a diagram showing the external appearance of a mobile communication terminal according to an embodiment of the present invention.
Figure 2:
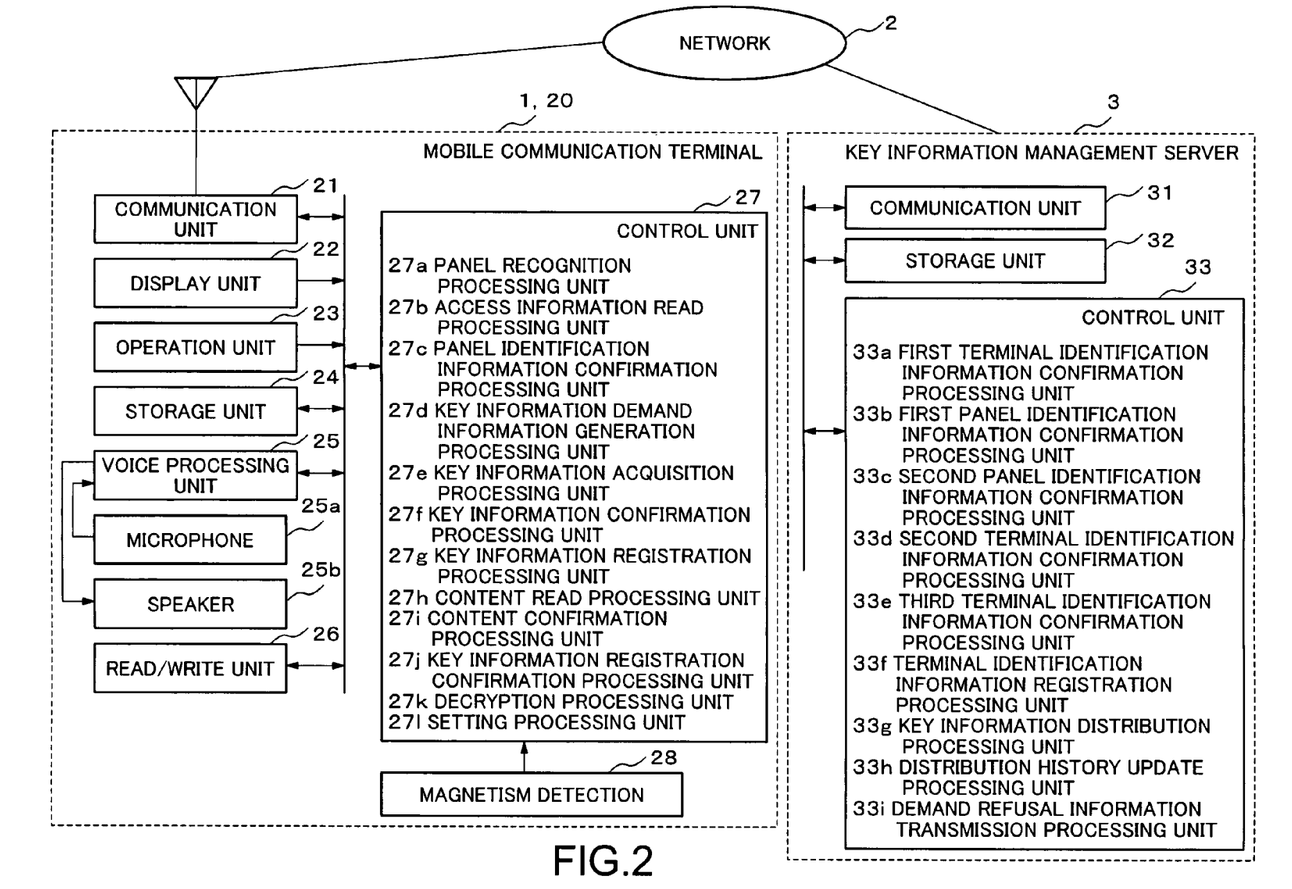
FIG. 2 is a block diagram showing the internal constitution of a mobile communication terminal main body and a key information management server according to an embodiment of the present invention.
Figure 3A:
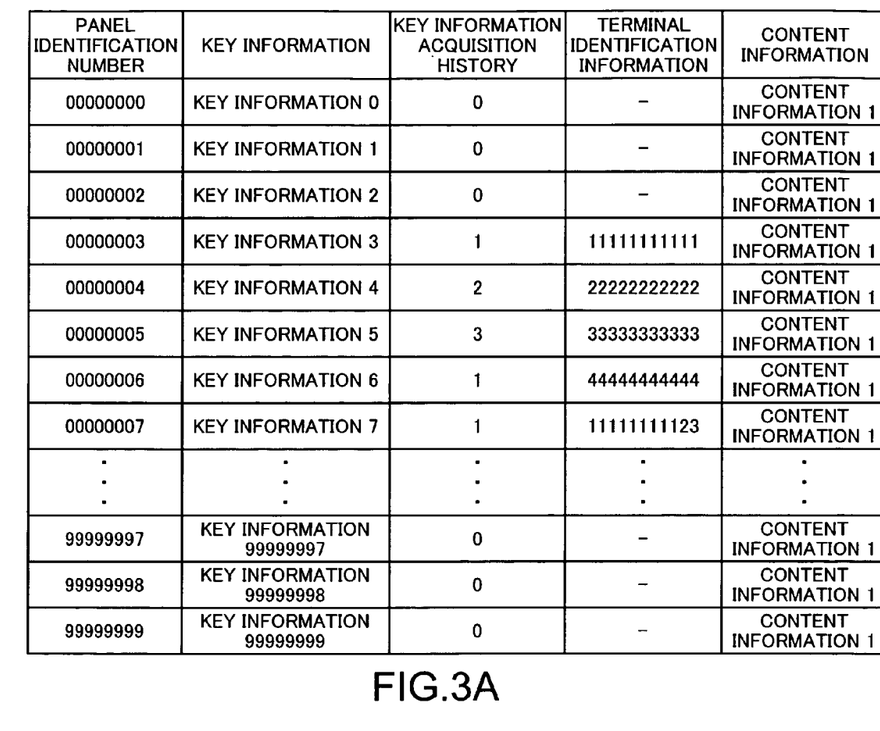
FIG. 3A is a diagram showing a panel management table stored in a storage unit of a server connected to a mobile communication terminal via a network according to an embodiment of the present invention.
Figure 3B:
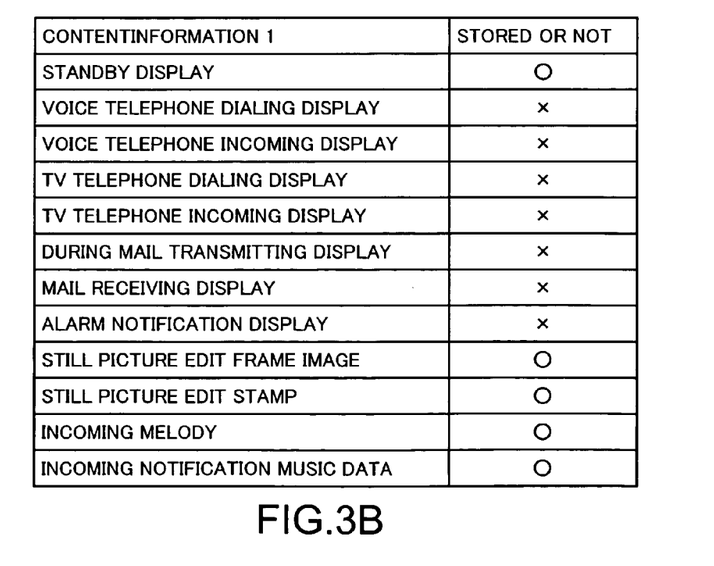
FIG. 3B is a diagram showing a data structure of content information.

FIG. 1 is a diagram showing the external appearance of a mobile communication terminal according to an embodiment of the present invention. FIG. 2 is a block diagram showing the internal structure of the main body of the mobile communication terminal. FIG. 3A shows a panel management table stored in a storage unit of a server connected to the mobile communication terminal via a network, and FIG. 3B is a diagram showing an example of the data structure of content information in the server.

As shown in FIG. 1, a mobile communication terminal 1 has a panel 10 and a main body 20. The mobile communication terminal 1 in FIG. 1 is a mobile phone, while, as a mobile communication terminal according to the present invention, it is also possible to use one having communication features such as a Personal Handyphone System (PHS) and Personal Digital Assistants (PDA)

The panel 10 is an attached body which is constituted to be attachable and detachable to the backside of the main body 20 (here, the backside is opposite to the side at which the display surface and the operation surface meet to coincide with each other when folding the phone), having a magnetic member 11 and a non-contact IC 12.

The magnetic member 11 is a member constituted of a magnet or a magnetic body for the main body to detect the presence/absence of the panel 10. The magnetic member 11 is arranged at a position corresponding to a magnetism detection unit 28 of the main body 20 when the panel 10 is attached to the main body 20. The magnetic members 11 may be provided to arrange not only one but also a plurality of ones at predetermined positions. By providing a plurality of the magnetic members 11 at the predetermined positions, it is also possible to identify the type of the panel 10.

The non-contact IC 12 is an IC of non-contact type that holds panel identification information, content data, and access information. The non-contact IC 12 performs data transfer with a read/write unit 26 of the main body 20 by electromagnetic waves. The non-contact IC 12 is arranged at a position corresponding to the read/write unit 26 of the main body 20 when the panel 10 is attached to the main body 20.

Here, panel identification information (attached body identification information) is information for identifying the panel 10 and not encrypted in the state of being held by the non-contact IC 12. The panel identification information is composed of, for example, an ID number.

The content data is encrypted in the state of being held by the non-contact IC 12 and includes, for example, images, incoming melodies, music data, game application software, and a part of dictionaries that the main body can use, or arbitrary combinations thereof.

Further, access information is information for accessing a key information management server 3 holding key information, not encrypted in the state of being held by the non-contact IC 12, and is, for example, access destination information such as the URL of the key information management server 3.

In addition, key information is information corresponding to panel identification information, for decrypting content data.

The main body 20 has a casing that can be attachably and detachably attached to the panel 10. As shown in FIGS. 1 and 2, the main body 20 has a communication unit 21, a display unit 22, an operation unit 23, a storage unit 24, a voice processing unit 25, a microphone 25a, a speaker 25b, the read/write unit 26, a control unit 27, and the magnetism detection unit 28.

The communication unit 21 performs communication with the key information management server 3 and devices (not shown) such as another person's mobile phone via a network 2. The display unit 22 displays images and characters of mails. The operation unit 23 is a part at which a user performs input operations using keys or the like. The storage unit 24 is a part for storing the data such as telephone directory, screen, mail, program, terminal identification information (for example, a telephone number), and (decrypted) content data. The voice processing unit 25 is a part that performs processing of a voice signal from the microphone 25a as well as outputting a voice signal for the speaker 25b.

The read/write unit 26 is a part for reading information stored in the non-contact IC 12 via electromagnetic waves and arranged at a predetermined position on the backside of the main body 20 (refer to FIG. 1). The read/write unit 26 transmits electromagnetic waves for generating power necessary for data processing of the non-contact IC 12.

The control unit 27 is a part for controlling the function of each component based on the software stored in the storage unit 24. The control unit 24 has a panel recognition processing unit 27a, an access information read processing unit 27b, a panel identification information confirmation processing unit 27c, a key information demand information generation processing unit 27d, a key information acquisition processing unit 27e, a key information confirmation processing unit 27f, a key information registration processing unit 27g, a content read processing unit 27h, a content confirmation processing unit 27i, a key information registration confirmation processing unit 27j, a decryption processing unit 27k, and a setting processing unit 27l.

The panel recognition processing unit 27a recognizes that the panel 10 is attached according to detection of the magnetic member 11 by the magnetism detection unit 28.

The access information read processing unit 27b, when the panel recognition processing unit 27a recognizes that the panel 10 is attached, demands panel identification information and access information (the URL of the key information management server 3) to the non-contact IC 12 via the read/write unit 26 and reads panel identification information and access information from the non-contact IC 12.

The panel identification information confirmation processing unit 27c confirms whether or not panel identification information identical to the panel identification information read by the access information read processing unit 27b is stored in the storage unit 24.

The key information demand information generation processing unit 27d, when the panel identification information confirmation processing unit 27c confirms that the identical panel identification information is not stored, reads the terminal identification information stored in the storage unit 24. The key information demand information is information for demanding key information corresponding to the panel identification information to the key information management server 3. To the key information demand information, panel identification information and terminal identification information is attached.

The key information acquisition processing unit 27e accesses the key information management server 3 based on the access information and transmits the key information demand information (panel identification information and terminal identification information are attached) to the key information management server 3. To the key information demand information, the key information management server 3 responds key information or refusal information to the key information acquisition processing unit. In addition, the refusal information is a message to refuse the demand of key information.

The key information confirmation processing unit 27f confirms whether or not the information acquired from the key information management server 3 is key information.

The key information registration processing unit 27g, when the key information confirmation processing unit 27f confirms that the information is the key information corresponding to the panel identification information, registers the key information and the panel identification information in the storage unit 24.

The content read processing unit 27h, when, the panel identification information confirmation processing unit 27c confirms that the panel identification information is stored, or when the key information registration processing unit 27g registers the key information and the panel identification information, demands content data to the non-contact IC 12 via the read/write unit 26. Then, the content read processing unit 27h reads the encrypted content data from the non-contact IC 12. Further, the content read processing unit 27h may read the (decrypted) content data from the storage unit 24 without demanding the contents to the non-contact IC when the (decrypted) content data is stored in the storage unit 24.

The content confirmation processing unit 27i confirms whether or not the content data read by the content read processing unit 27h is the data read from the non-contact IC 12. The content confirmation processing unit 27i judges that the data is read from the non-contact IC 12 if the content data is encrypted, and judges that the data is not read from the non-contact IC 12 if the content data is decrypted.

The key information registration confirmation processing unit 27j confirms, when the content confirmation processing unit 27i confirms that the content data is read from the non-contact IC 12, whether or not key information corresponding to the content data is registered in the storage unit 24.

The decryption processing unit 27k, when the panel identification information confirmation processing unit 27c confirms that the identical panel identification information is stored, or when the key information registration confirmation processing unit 27j confirms that key information is registered in the storage unit 24, decrypts the encrypted content data based on the key information.

The setting processing unit 27l performs setting processing (setting addition, modification, deletion) for the use in the mobile communication terminal 1 based on the content data decrypted by the decryption processing unit 27k or the (decrypted) content data stored in the storage unit 24. The contents of the setting processing include, for example, voice telephone dialing display setting processing, voice telephone incoming display setting processing, TV telephone dialing display setting processing, TV telephone incoming display setting processing, mail transmitting display setting, processing, mail receiving display setting processing, alarm notification display setting processing, menu display setting processing, standby display setting processing, voice telephone incoming notification setting processing, TV telephone incoming notification setting processing, mail reception completion notification setting processing, wakeup alarm notification setting processing and a schedule alarm notification setting processing.

The magnetism detection unit 28 is a part for detecting (the presence or absence of) the magnetic member 11 of the panel 10 on the backside of the main body 20 and is arranged at a predetermined position on the backside of the main body 20 (refer to FIGS. 1 and 2). The magnetism detection unit 28 is composed of, for example, a Hall device, a magnetism-sensitive element, and a magnetism sensor. The magnetism detection units 28 may be arranged at not only one but also a plurality of ones of the predetermined positions. By providing the magnetism detection units 28 at a plurality of predetermined positions, it becomes possible to identify the kind of the panel 10.

The network 2 is a communication means with a radio base station, an exchange station, an Internet line, etc.

The key information management server 3 is a server that manages key information and has a communication unit 31, a storage unit 32, and a control unit 33 as shown in FIG. 2.

The communication unit 31 is a part for performing communication with the mobile communication terminal 1 via the network 2. The storage unit 32 is a part for storing data such as panel management table and program. In addition, the storage unit 32 is not necessarily to exist within the key information management server 3 and maybe, for example, an external storage device connected to the key information management server 3.

The panel management table (attached body management table) shown in FIG. 3A is a table for managing key information, key information acquisition history, terminal identification information, and content information corresponding to each piece of panel identification information. The key information is information for decrypting the content data corresponding to the panel identification information. The key information acquisition history is a history of number of times of distribution of the corresponding key information in the past. The key information acquisition history is zero if the corresponding key information has not been distributed in the past. The terminal identification information is, for example, the telephone number of a mobile communication terminal that has acquired the corresponding key information and its box is blank if the key information has not been acquired. The content information is information of the summarized contents of the content data and an example of its data structure is shown in FIG. 3B.

The control unit 33 of the key information management server controls the function of each component based on the software stored in the storage unit 32. The control unit 33 has a first terminal identification information confirmation processing unit 33a, a first panel identification information confirmation processing unit 33b, a second panel identification information confirmation processing unit 33c, a second terminal identification information confirmation processing unit 33d, a third terminal identification information confirmation processing unit 33e, a terminal identification information registration processing unit 33f, a key information distribution processing unit 33g, a distribution history update processing unit 33h, and a refusal information transmission processing unit 33i.

The first terminal identification information confirmation processing unit 33a confirms whether or not terminal identification information is attached to the key information demand information from the mobile communication terminal 1.

When the first terminal identification information confirmation processing unit 33*a* confirms that terminal identification information is attached to the received key information demand signal, the first panel identification information confirmation processing unit 33*b* confirms whether or not panel identification information is attached to the key information demand information from the mobile communication terminal 1.

When the first panel identification information confirmation processing unit 33*b* confirms that panel identification information is attached to the key information demand information, the second panel identification information confirmation processing unit 33*c* confirms whether or not panel identification information corresponding to the attached panel identification information exists in the panel management table within the storage unit 32.

When the second panel identification information confirmation processing unit 33*c* confirms that corresponding panel identification information exists, the second terminal identification information confirmation processing unit 33*d* confirms whether or not terminal identification information linked with the panel identification information exists in the panel management table within the storage unit 32.

When the second terminal identification information confirmation processing unit 33*d* confirms that terminal identification information exists, the third terminal identification information confirmation processing unit 33*e* confirms whether or not the stored terminal identification information and the attached terminal identification information are identical to each other.

When the second terminal identification information confirmation processing unit 33*d* confirms that terminal identification information does not exist, the terminal identification information registration processing unit 33*f* initially registers the attached terminal identification information by linking it to the corresponding panel identification information in the panel management table. Alternatively, the initial registration to the server may be made by the seller of the attached body.

When the third terminal identification information confirmation processing unit 33*e* confirms that the terminal identification information is identical or when the terminal identification information registration processing unit 33*f* (initially) registers the terminal identification information by linking it to the panel identification information, the key information distribution processing unit 33*g* reads key information corresponding to the panel identification information from the panel management table, accesses the mobile communication terminal 1 based on the terminal identification information, and sends the read key information to the mobile communication terminal 1.

The distribution history update processing unit 33*h*, after distributing key information from the key information distribution processing unit 33, updates the key information distribution history corresponding to the key information by adding one count.

When the first terminal identification information confirmation processing unit 33*a* confirms that terminal identification information is not attached to the key information demand information, when the first panel identification information confirmation processing unit 33*b* confirms that panel identification information is not attached to the key information demand information, when the second panel identification information confirmation processing unit 33*c* confirms that corresponding panel identification information does not exist, or when the third terminal identification information confirmation processing unit 33*e* confirms that the terminal identification information is not identical, the refusal information transmission processing unit 33*i* transmits refusal information to the mobile communication terminal 1 that has accessed.

Figure 4:
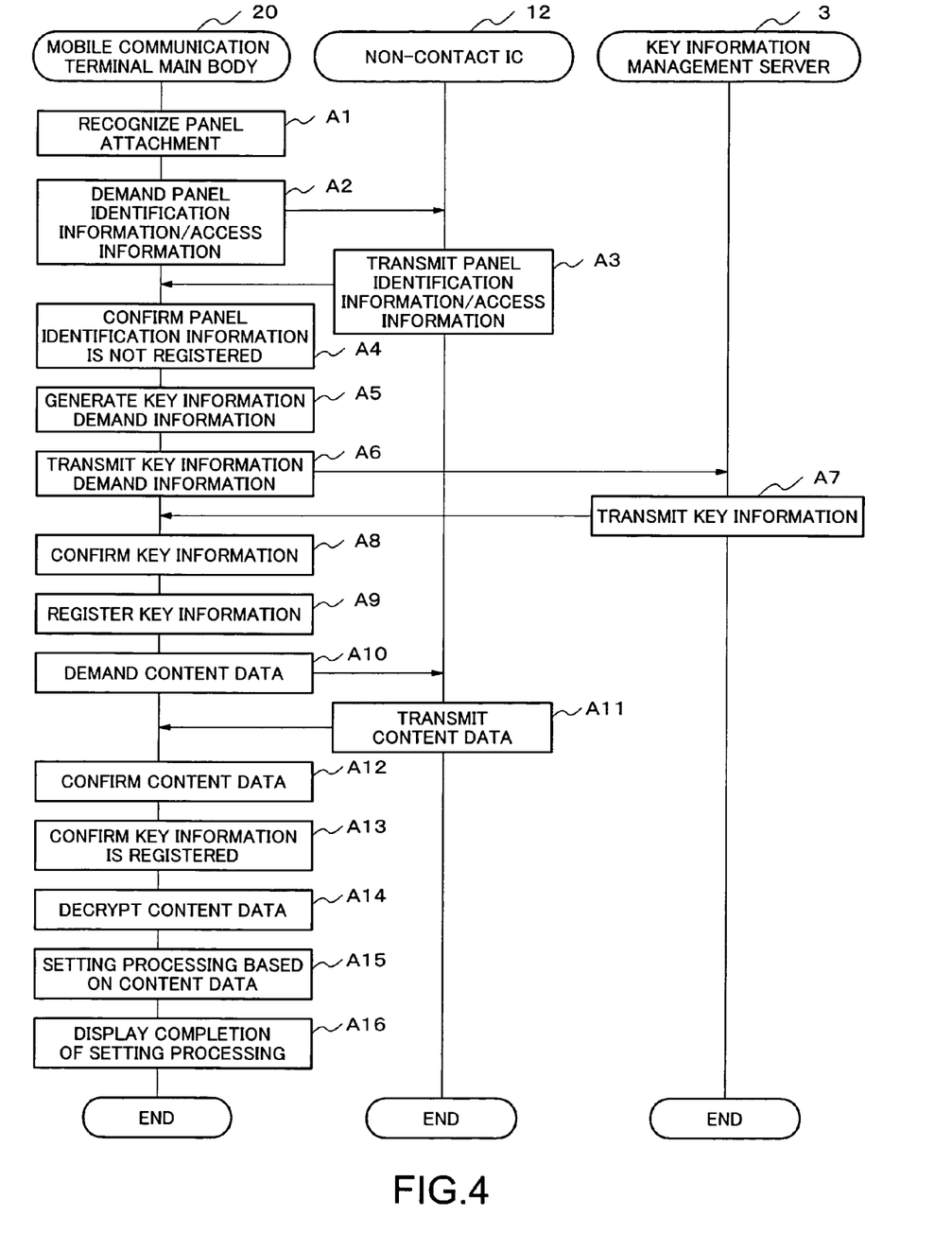
FIG. 4 is a diagram showing a first operation of a mobile communication terminal and a key information management server according to an embodiment of the present invention.

Next, a first operation of the mobile communication terminal and the key information management server according to the embodiment of the present invention will be explained below. FIG. 4 is a diagram showing the first operation of the mobile communication terminal and the key information management server according to the embodiment of the present invention. The first operation is performed when a user attaches the panel 10 (having the magnetic member 11 and the non-contact IC 12) to the main body 20 of a mobile communication terminal for the first time.

First, when the user attaches the panel 10 to the main body 20 of the mobile communication terminal, the magnetism detection unit 28 of the main body 20 detects the magnetic member 11. According to this detection, the main body 20 recognizes that the panel 10 has been attached (step A1).

Next, the main body 20 demands panel identification information and access information to the non-contact IC 12 (step A2). In response to this demand, the non-contact IC 12 transmits panel identification information and access information to the main body 20 (step A3).

The main body 20 acquires the panel identification information and the access information from the non-contact IC 12. The main body 20 confirms that panel identification information identical to the panel identification information is not registered in the storage unit 24 (step A4). When confirming that panel identification information is not stored, the main body 20 generates key information demand information attached with panel identification information and access information (step A5). Next, the main body 20 transmits the generated key information demand information to the key information management server 3 (step A6).

The key information management server 3 receives key information demand information from the main body 20 and transmits corresponding key information to the main body 20 (step A7).

Next, upon receipt of key information from the key information management server 3, the main body 20 confirms that it is the key information corresponding to the panel identification information (step A8). Next, the main body 20 registers the key information and the panel identification information (step A9). Next, the main body 20 demands content data to the non-contact IC 12 (step A10).

In response to this content data demand, the non-contact IC 12 transmits the encrypted content data to the main body 20 (step A11).

Upon receipt of the encrypted content data from the non-contact IC 12, the main body 20 confirms that the content data is the data read from the non-contact IC 12 (step A12). Next, the main body 20 confirms that the key information corresponding to the received content data is registered (step A13). Next, the main body 20 decrypts the received content data (step A14). Next, the main body 20 performs setting processing based on the decrypted content data (step A15). Finally, the main body 20 displays the completion of setting processing when setting processing is completed and ends the operation (step A16).

Figure 5:
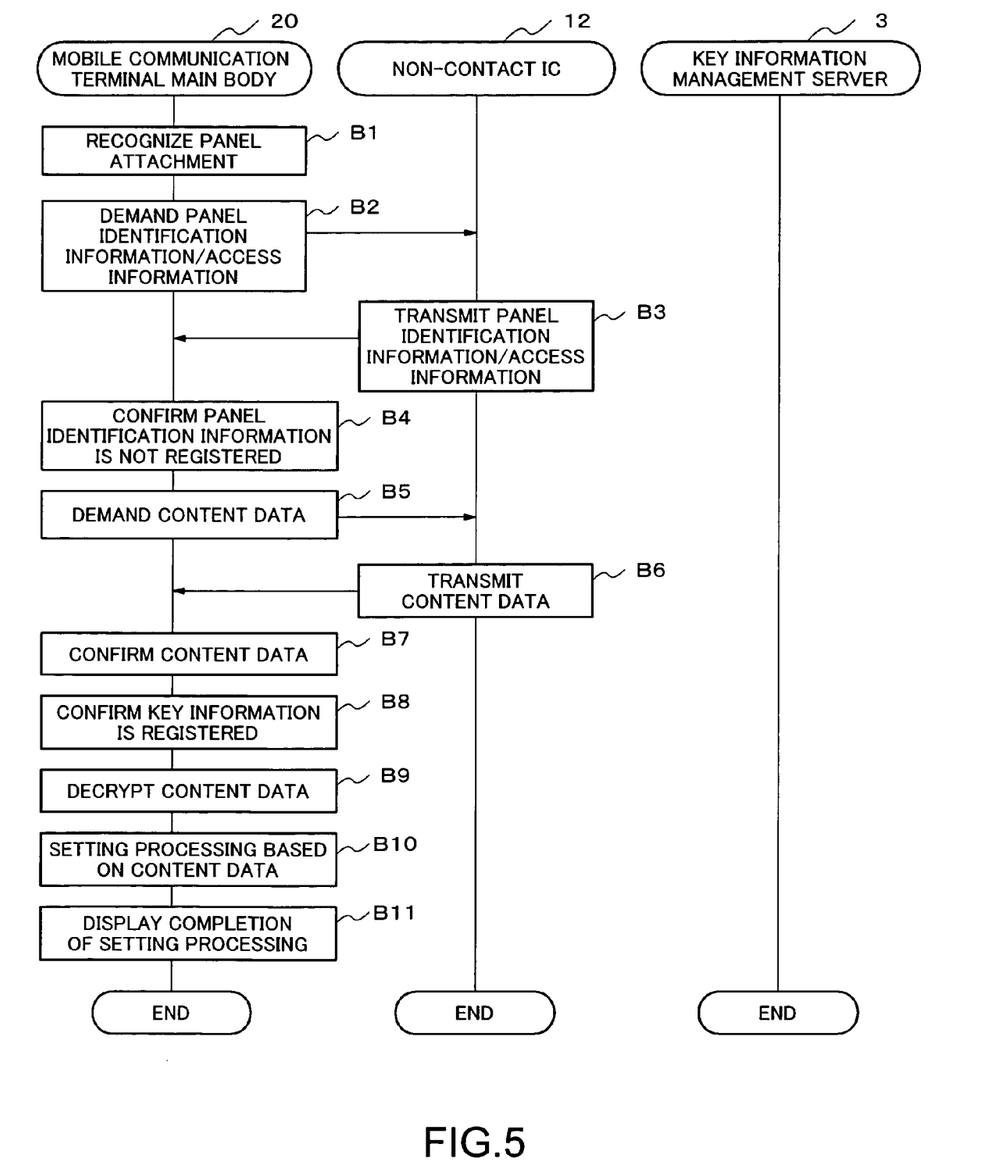
FIG. 5 is a diagram showing a second operation of a mobile communication terminal and a key information management server according to an embodiment of the present invention.

Next, a second operation of the mobile communication terminal and the key information management server according to the embodiment of the present invention will be explained below. FIG. 5 is a diagram showing the second operation. The second operation is performed when the panel 10 is attached again to the mobile communication terminal to which the panel 10 has been attached one time or more in the past. That is, the above-mentioned first operation has been performed in the past between the panel 10 and the main body 20 and the main body 20 has already held the panel identification information and key information of the panel 10.

First, when the user attaches the panel 10 to the main body 20 of the mobile communication terminal, the magnetism detection unit 28 of the main body 20 detects the magnetic member 11. Depending on this detection, the main body 20 recognizes that the panel 10 has been attached (step B1). Next, the main body 20 demands panel identification information and access information to the non-contact IC 12 (step B2).

The non-contact IC 12 transmits panel identification information and access information to the main body 20 (step B3).

The main body 20 receives panel identification information and access information from the non-contact IC 12. Then, the main body 20 confirms that panel identification information identical to the received panel identification information is registered in the storage unit 24 (step B4). Next, the main body 20 demands content data to the non-contact IC 12 (step B5).

Next, the non-contact IC 12 transmits the encrypted content data to the main body 20 (step B6).

The main body 20 receives the encrypted content data from the non-contact IC 12 and confirms that the content data is the data read from the non-contact IC 12 (step B7). Next, the main body 20 confirms that key information corresponding to the received content data is registered (step B8). Next, the main body 20 decrypts the received content data (step B9). Next, the main body 20 performs setting processing based on the decrypted content data (step B10). Finally, the main body 20 displays the completion of setting processing when setting processing is completed and ends the operation (step B11).

Figure 6:
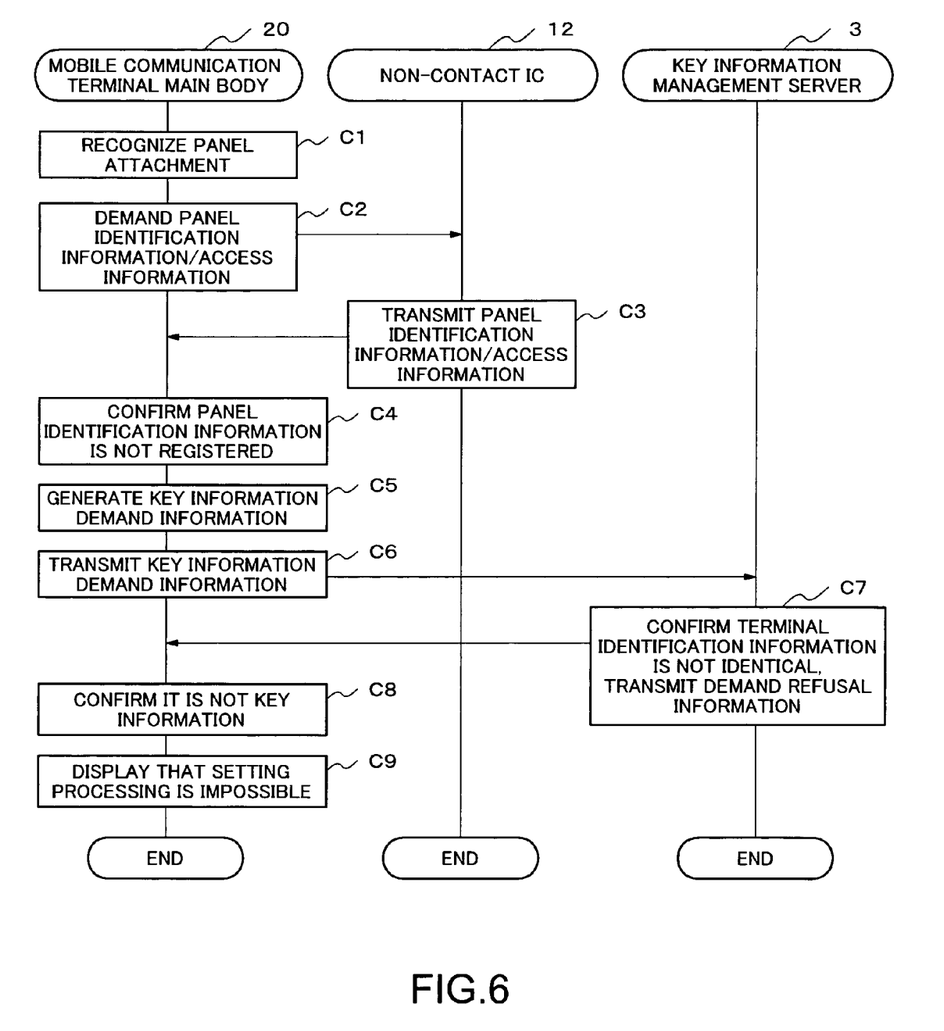
FIG. 6 is a diagram showing a third operation of a mobile communication terminal and a key information management server according to an embodiment of the present invention.

Next, a third operation of the mobile communication terminal and the key information management server according to the embodiment of the present invention will be explained below with reference to FIG. 6. FIG. 6 is a diagram showing the third operation. The third operation is performed when, after used legally, the panel 10 is attached to the main body 20 of another person's mobile communication terminal.

First, when the user attaches the panel 10 to the main body 20 of the mobile communication terminal, the magnetism detection unit 28 of the main body 20 detects the magnetic member 11. According to this detection, the main body 20 recognizes that the panel 10 has been attached (step C1). Next, the main body 20 demands panel identification information and access information to the non-contact IC 12 (step C2).

The non-contact IC 12 transmits panel identification information and access information to the main body 20 (step C3).

Next, the main body 20 receives panel identification information and access information from the non-contact IC 12 and confirms that panel identification information identical to the panel identification information is not registered in the storage unit 24 (step C4). The main body 20 confirms that panel identification information is not stored, thereby generates key information demand information attached with panel identification information and terminal identification information (step C5). Next, the main body 20 transmits the generated key information demand information to key information management server 3 (step C6).

Upon receipt of key information demand information from the main body 20, the key information management server 3 confirms the terminal identification information attached to the key information demand information and the registered terminal identification information are not identical to each other and transmits refusal information to the main body 20 (step C7).

The main body 20 receives refusal information from the key information management server 3, thereby confirms that is it not key information (step C8). Finally, the main body 20 confirms that it is not key information, then displays that setting processing is impossible (step C9) and ends the operation.

Figure 7:
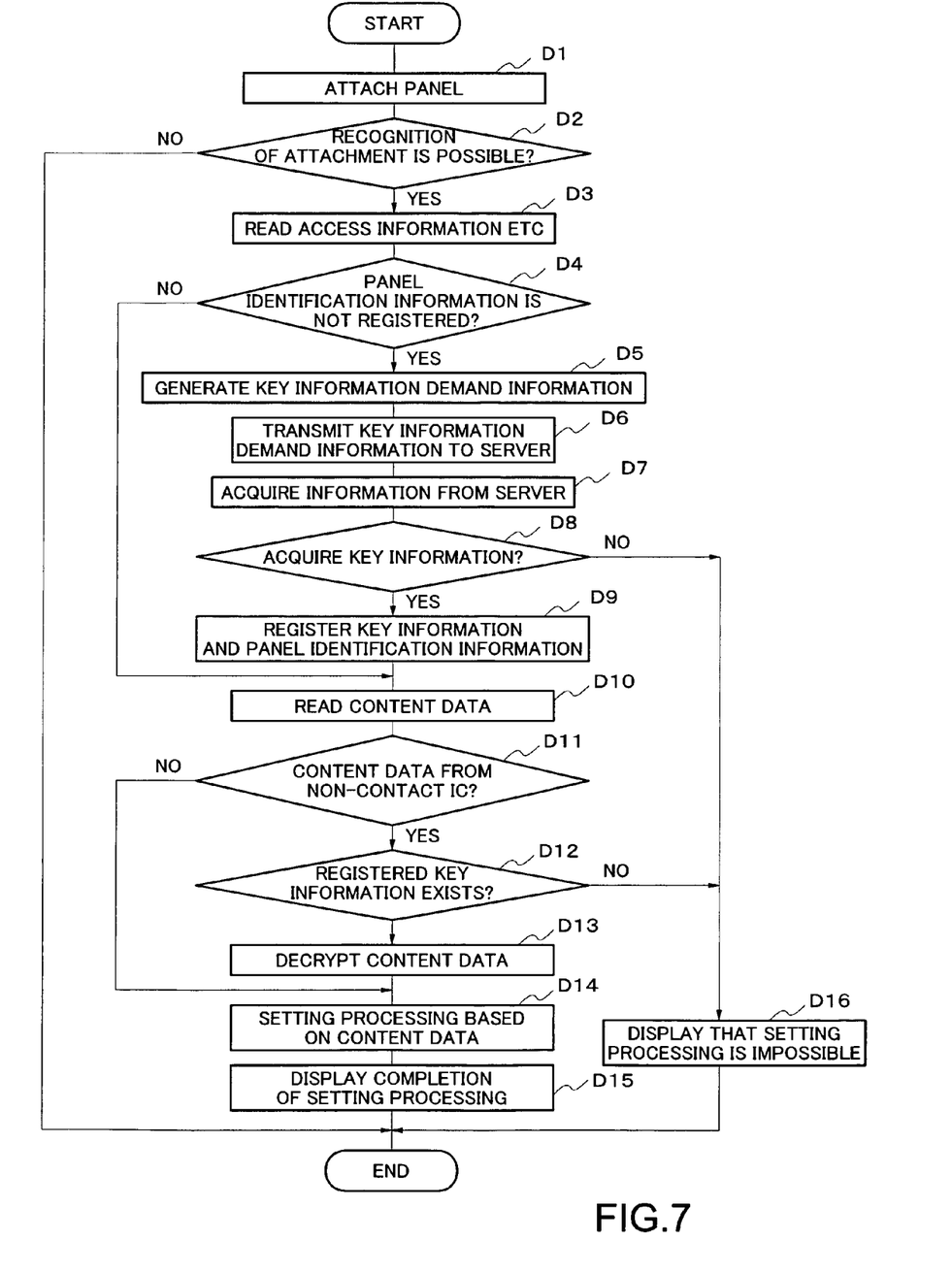
FIG. 7 is a flow chart showing the operation of a mobile communication terminal according to an embodiment of the present invention.

Next, the operation of the mobile communication terminal according to the embodiment of the present invention will be explained below in detail. FIG. 7 is a flow chart showing the operation of the mobile communication terminal according to the embodiment of the present invention.

First, a user attaches the panel 10 to the main body 20 of the mobile communication terminal (step D1). Next, the main body 20, when the magnetism detection unit 28 detects the magnetic member 11, confirms whether or not the panel recognition processing unit 27a can recognize attachment of the panel 10 (step D2). When confirming that recognition of attachment of the panel 10 is impossible (NO in step D2), the main body 20 ends the operation without performing any processing. Here, as cases where attachment of the panel 10 is not recognizable, the cases include, for example, a case where no magnetic member is provided to the panel 10, a case where the panel 10 is not attached to the main body 20 correctly, and the like.

When attachment of the panel 10 is recognized (YES in step D2), in the main body 20, the access information read processing unit 27b (FIG. 2) demands panel identification information and access information (for example, URL of the key information management server 3) to the non-contact IC 12 via-the read/write unit 26 and reads panel identification information and access information from the non-contact IC 12 (step D3).

Next, the main body 20 confirms whether or not panel identification information identical to the panel identification information read by the access information read processing unit 27b is registered in the storage unit 24 (step D4). When confirming that the identical panel identification information is already registered (NO in step D4), the processing of the main body 20 proceeds to step D9.

When confirming that the identical panel identification information is not registered in the storage unit 24 (YES in step D4), in the main body 20, the key information demand information generation processing unit 27d reads the terminal identification information stored in the storage unit 24 and prepares information for demanding key information corresponding to the panel identification information to the key information management server 3. The key information demand information generation processing unit 27d attaches panel identification information and terminal identification information to the key information demand information (step D5).

Next, in the main body 20, the key information acquisition processing unit 27e accesses the key information management server 3 based on access information and transmits key information demand information (attached with panel identification information and terminal identification information) to the key information management server 3 (step D6). Next, the main body 20 acquires key information or refusal information from the key information management server 3 (step D7).

In step D8, in the main body 20, the key information confirmation processing unit 27f confirms whether or not the information acquired from the key information management server 3 is key information (step D8). In addition, when that it is not key information is confirmed (NO in step D8), the processing of the main body 20 proceeds to step D16.

When it is confirmed that the information received from the key information management server is key information (YES in step D8), in the main body 20, the key information registration processing unit 27g registers key information and panel identification information in the storage unit 24 (step D9).

After step D9 or when the confirmation result in step D4 is that the identical panel identification information is registered, the main body 20 demands content data to the non-contact IC 12 and reads the encrypted content data from the non-contact IC 12 using the content read processing unit 27h and the read/write unit 26 (step D10). In addition, when the contents in the non-contact IC 12 have been read before by the main body and the decrypted contents remain in the main body, it may be possible to perform read processing of the decrypted contents held in the main body instead of performing the processing in step D10.

Next, the main body 20 confirms whether or not the read content data is the data read from the non-contact IC 12 using the content confirmation processing unit 27i (step D11). When it is confirmed that the content data is not the data read from the non-contact IC 12 (NO in step D11), the processing of the main body 20 proceeds to step D14.

When the content data read in step D10 is the data read from the non-contact IC 12 (YES in step D11), the main body 20 confirms whether or not key information corresponding to the content data is registered in the storage-unit 24 using the key information registration confirmation processing unit 27j (step D12). When it is confirmed that key information is not registered (NO in step D12), the processing of the main body 20 proceeds to step D16.

Here, cases where key information is not registered include a case where key information has been deleted by processing, not shown, or the user's operation or the like. In this case, this makes it possible to set the contents by acquiring key information again with operation or processing not shown.

When confirming that key information is registered (YES in step D12), the main body 20 decrypts the encrypted content data based on key information using the decryption processing unit 27k (step D13).

After step D13 or when the confirmation result in step D11 is that the content data is not the data read from the non-contact IC 12 (NO in step D11), the main body 20 performs setting processing for utilizing the decrypted content data in the mobile communication terminal 1 using the setting processing unit 27l (step D14). Next, the main body 20 displays the completion of setting processing when setting processing is completed (step D15) and ends the operation.

When confirming that the information received from the key information management server is not key information in step D8 or when confirming that key information is not registered in the main body in step D12, the main body 20 displays that setting processing is impossible on the display unit (step D16) and ends the processing. According to this, it is possible to prevent a use by illegally reading the content data in the non-contact IC 12 of the panel 10.

Figure 8:
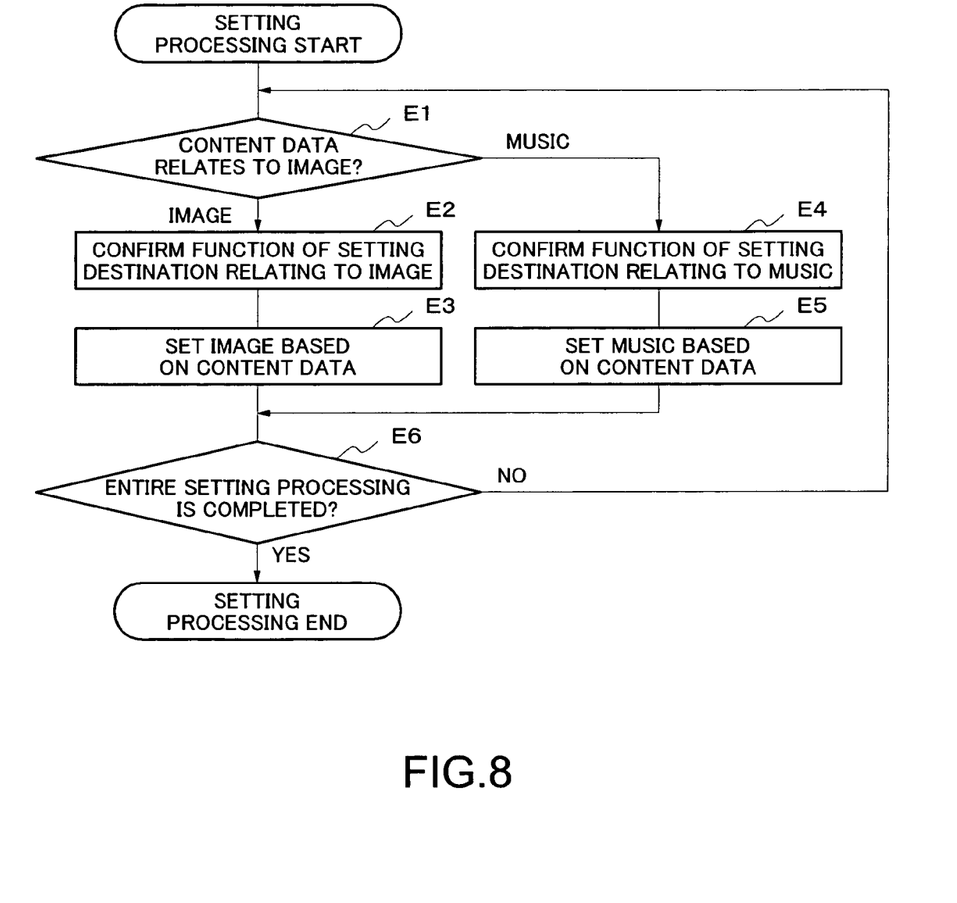
FIG. 8 is a flow chart showing the operation of a setting processing unit of a mobile communication terminal according to an embodiment of the present invention.

Next, the setting processing of content data of the mobile communication terminal (step D14 in FIG. 7) will be explained below in detail. FIG. 8 is a flow chart showing the operation of the setting processing unit 27 of the mobile communication terminal. Here, the content data relating to the setting of each function of the mobile communication terminal is roughly divided into two kinds. One is content data relating to images and the other is content data relating to sound or voice. The constitution of the mobile communication terminal has already been explained with reference to FIGS. 1 and 2.

First, the main body 20 supplies the decrypted content data to the setting processing unit 27l and confirms whether the content data relates to images or music (step E1).

When confirming that the content data relates to images (step E1: image), the main body 20 confirms the function of the setting destination relating to images corresponding to the content data (step E2). Next, the main body 20 sets images for the confirmed function of the setting destination relating to images based on the content data (step E3). Functions of the setting destination relating to images include, for example, a voice telephone dialing function, a voice telephone incoming function, a TV telephone dialing function, a TV telephone incoming function, a mail transmission function, a mail reception function, a schedule/wakeup alarm notification function, a menu display, a standby display, and the like.

When confirming that the content data relates to music (step E1: music), the main body 20 confirms the function of the setting destination relating to music corresponding to the content data (step E4). Next, the main body 20 sets music for the confirmed function of the setting destination relating to music based on the content data (step E5). Functions of the setting destination relating to music include, for example, a voice telephone incoming function, a TV telephone incoming function, a mail reception function, a wakeup alarm function, a schedule alarm function, and the like.

After step E3 or step E5, the main body 20 confirms whether or not the entire setting processing based on the content data has been completed (step E6). When not completed (NO in step E6), the processing of the main body 20 proceeds to step E1. When confirming completion (YES in step E6), the main body 20 ends the setting processing.

When the contents of the setting destination have plural functions, it may be possible to demand user's confirmation as to whether to continue or not the setting processing by displaying on completion of setting of one of the functions or demand user's confirmation as to whether to abort or not by displaying during setting processing. When the user aborts the processing, the setting until the user aborts is effective and only the function having undergone the setting processing can use images or music relating to the content data. Alternatively, at the time of attachment of the panel, it may be possible to display a screen to ask the user which function of the setting destination among the plural functions of the setting destination corresponding to the content data to change and perform setting processing based on the content data for the function of the setting destination that the user has selected.

Figure 9:
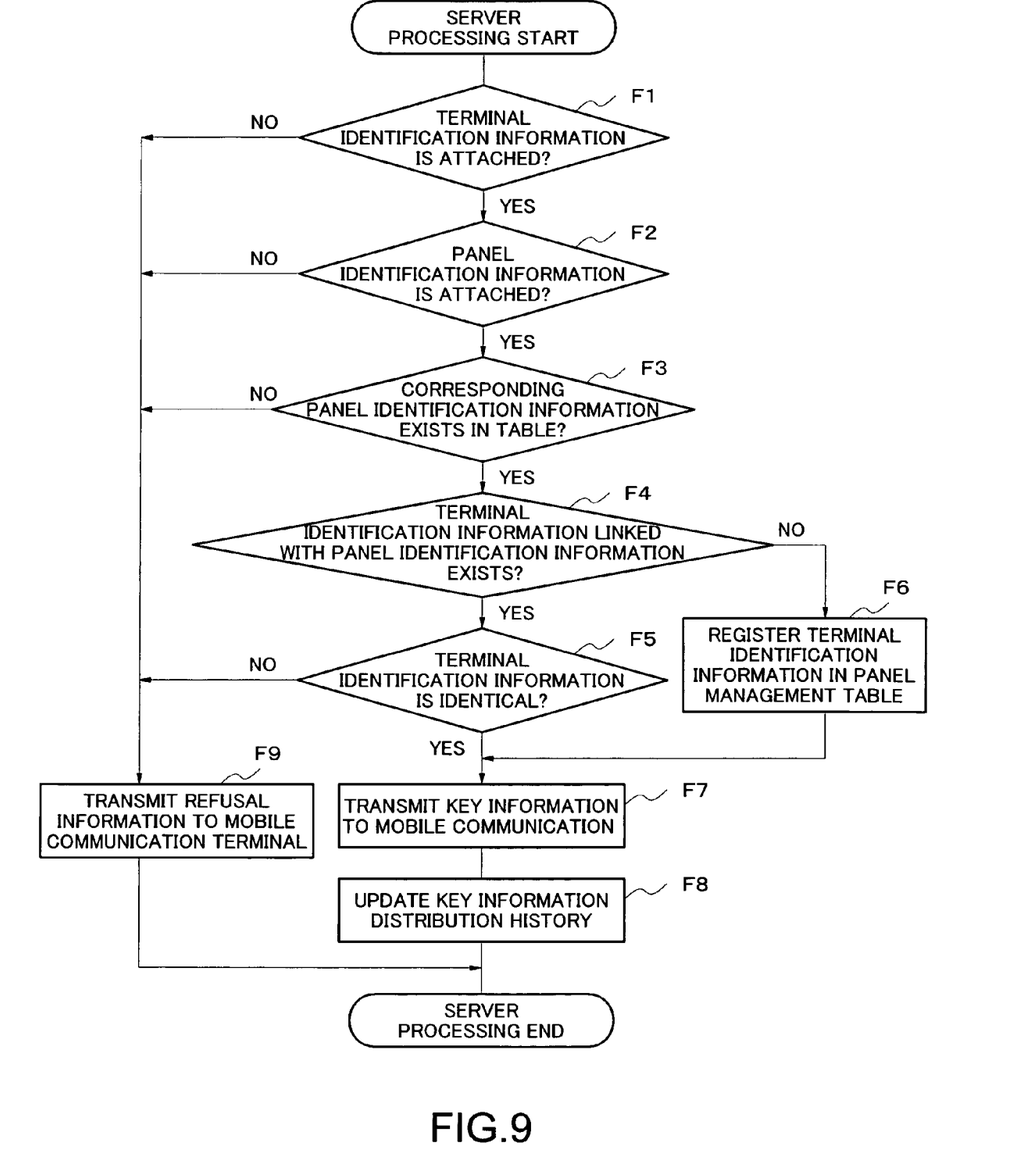
FIG. 9 is a flow chart showing the operation of a key information management server according to an embodiment of the present invention.

Next, the operation of the key information management server 3 in FIG. 2 will be explained below in detail. FIG. 9 is a flow chart showing the operation of the key information management server.

First, the key information- management server 3 (hereinafter, abbreviated and referred to "server") is accessed by the mobile communication terminal 1 and receives key information demand information from the mobile communication terminal 1. Then, the server 3 confirms whether or not terminal identification information is attached to key information demand information using the first terminal identification information confirmation processing unit 33a (step F1). When terminal identification information is not attached (NO in step F1), the processing of the server 3 proceeds to step F9.

When the judgment result in step F1 is YES, the server 3 confirms whether or not panel identification information is attached to key information demand information using the first panel identification information confirmation processing unit 33*b* (step F2). When panel identification information is not attached to key information demand information (NO in step F2), the processing of the server 3 proceeds to step F9.

When the judgment result in step F2 is YES, the server 3 confirms whether or not panel identification information corresponding to the attached panel identification information exists in the panel management table (FIG. 3A) of the storage unit 32 using the second panel identification information confirmation processing unit 33*c* (step F3). When the corresponding panel identification information does not exist in the panel management table (NO in step F3), the processing of the server 3 proceeds to step F9.

When confirming that the corresponding panel identification information exists in the storage unit 32 (YES in step F3), the server 3 confirms whether or not terminal identification information linked with panel identification information exists in the panel management table of the storage unit 32 using the second terminal identification information confirmation processing unit 33*d* (step F4).

When confirming that terminal identification information exists (YES in step F4), the server 3 confirms whether or not the stored terminal identification information and the terminal identification information attached to the key information demand information are identical using the third terminal identification information confirmation processing unit 33*e* (step F5). When both are not identical (NO in step F5), the processing of the server 3 proceeds to step F9.

When the judgment result in step F4 shows that terminal identification information linked with panel identification information does not exist (NO in step F4), the server 3 registers the terminal identification information attached to the key information demand information in the panel management table by linking it with the panel identification information using the terminal identification information registration processing unit 33*f* (step F6).

When the judgment result is YES in step F5 or after step F6 is performed, the key information management server 3 reads key information corresponding to the panel identification information from the panel management table using the key information distribution processing unit 33*g*. Then, the server 3 accesses the mobile communication terminal 1 based on the terminal identification information and distributes the read key information to the mobile communication terminal 1 (step F7). Here, let us explain the reason of the distribution of the key information, also when the confirmation result is that the terminal identification information is identical. The reason is to re-transmit the key information when the mobile communication terminal demands the key information again.

Next, the server 3 updates the key information distribution history corresponding to the key information by adding one count using the distribution history update processing unit 33*h* (step F8) and ends the processing.

When at least one of terminal identification information and panel identification information is not attached to the key information demand information (NO in step F1, and NO in step F2), when the corresponding panel identification information does not exist (NO in step F3), or when the terminal identification information is not identical (NO in step F5), the server 3 transmits refusal information to the mobile communication terminal 1 using the refusal information transmission processing unit 33*i* (step F9) and ends the processing. That is, when the access is judged to be unauthorized, the key information management server 3 transmits refusal information to the mobile communication terminal 1.

According to the embodiment, it is possible to obtain new content data of an image of the menu display, a standby image, an incoming melody, a wakeup function, an alarm notification sound that sounds at the time specified by the schedule function, an image to display at the time of transmission and reception of a mail, an image to display at the time of transmission and reception of voice/TV telephone of the mobile communication terminal 1, or the like by exchanging panels.

Further, it is possible to provide content data such as an image, an incoming melody, music data, game application software, and a dictionary that can be used in the main body 20 of the mobile communication terminal 1 in accordance with a panel.

Furthermore, it is possible to prevent data theft by an imposter and to protect content data held in the panel 10 by encrypting the content data held in the non-contact IC 12 in the panel 10.

Still furthermore, it is possible to protect content data by managing key information for decrypting the content data held in the non-contact IC 12 in the panel 10 by the key information management server 3 along with panel identification information and by, when the panel 10 (holding contents in the non-contact IC) is transmitted to the main body 20 of the mobile communication terminal 1, making available the content data held in the non-contact IC 12 in the panel 10 by acquiring the key information from the key information management server 3.

In addition, since the key information management server 3 manages the distribution history of the key information for decrypting the encrypted content data held in the non-contact IC 12 in the panel 10 and the terminal identification information for identifying the mobile communication terminal 1 to which the distribution has been made in the panel management table, it is possible to protect the content data even when the panel 10 is attached to a mobile communication terminal of a user other than the authorized user of the panel 10 and demand for acquisition of key information is made, because provision of key information is not made to a user other than the authorized user.

In the above explanation, only for the mobile communication terminal to which the panel has been attached for the first time, its terminal identification information is registered (by step F6 in FIG. 9) in the key information management server by the processing in step F6 in FIG. 9. The reason for such a constitution is that we suppose a situation in which a user accesses the key information management server in a shop immediately after the purchase of a panel.

Figure 10:
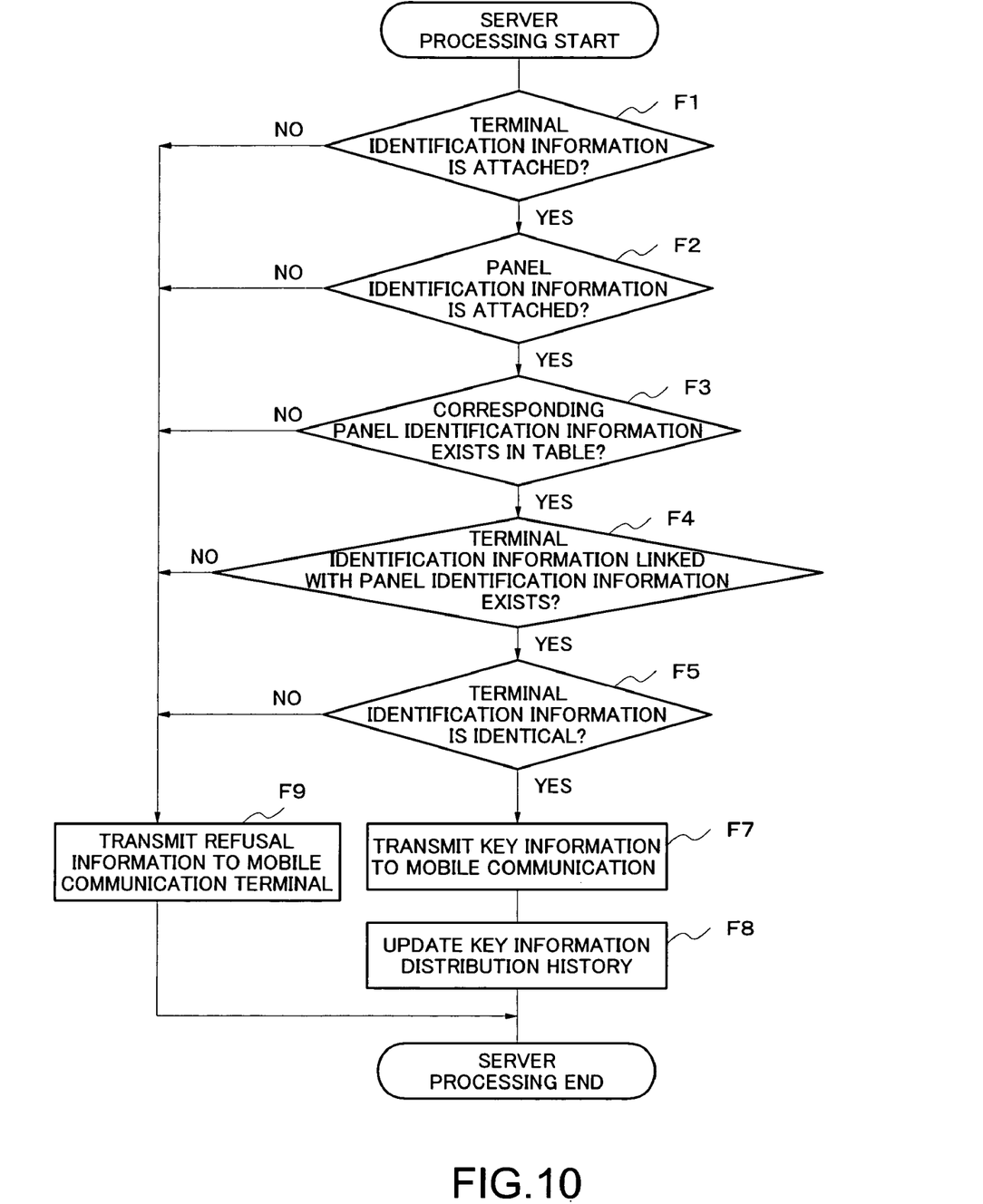
FIG. 10 is a flow chart showing the operation of a key information management server according to another embodiment of the present invention.

For a user who thinks such an operation at the time of purchase is troublesome, it may be possible to ask the shop to register panel identification number and terminal identification information in pairs to the key information management server at the time of purchase of an attached body. In this case, registration of terminal identification information and panel identification number to the key information management server is performed by the shop. In this case, the connection destination of NO-branch from step F4 in FIG. 9 is changed to step F9 and step F6 is no longer necessary as shown in FIG. 10. According to such a distributing system, even if a user loses the panel before use immediately after the purchase of it, it is possible to prevent an unauthorized use of the contents.

In the embodiment explained above, panel identification information, access information, and encrypted contents are stored in the non-contact IC, and the non-contact IC is mounted on the panel that can be attached to a mobile communication terminal. However, the present invention is not limited only to the use of a panel but a cartridge or a recording medium that can be attached to a mobile communication terminal may be included. We explain this point with the following embodiment.

Next, we will explain another embodiment of a mobile communication terminal of the present invention. The mobile communication terminal according to the present embodiment is a mobile game machine, having a cartridge and a main body. The cartridge is an attached body constituted so as to be attachably and detachably attached to the main body, having the same magnetic member and non-contact IC as those of the panel in the above-mentioned embodiment. The non-contact IC incorporates content data of such as a mini game and a new character. The main body is constituted so as to be attachably and detachably attached to the cartridge, having the same components as those of the main body in the first embodiment. A read/write unit of the main body reads information in the non-contact IC of the cartridge via electromagnetic waves. A magnetism detection, unit of the main body detects presence or absence of a magnetic member of the cartridge. The operation of the mobile communication terminal according to the present embodiment is the same as the operation of the mobile communication terminal according to the already explained embodiment.

According to the present embodiment, it is possible to provide a new game service by reading contents data such as character data and mini game held in the non-contact IC within the cartridge in the scene of the game or at the start of the game. Further, in application to a network game, by sending the information read by a mobile game machine to the key information management server, it is possible to provide a new story for the game and a new function.

Furthermore, in the above-mentioned embodiments, panel identification information, access information, and encrypted contents are stored in the non-contact IC mounted on the attached body such as a panel and a cartridge. According to the present invention, it is possible to use a recording medium such as compact disc (CD), digital versatile disc (DVD), and floppy disc as an attached body. In this case, panel identification information, access information, and encrypted contents are stored in the recording medium. Further, in this case, the magnetic member 11 and the magnetism detection unit 28 in FIG. 1 are no longer necessary and the above-mentioned embodiments are modified such that the mobile communication terminal recognizes the attachment of an attached body by performing a step such as one for reading header information or the like of the attached recording-medium and demands access information or the like to the recording medium.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and-scope of the following claims. Further, the inventor's intent is to retain all equivalents even if the claims are amended during prosecution.

What is claimed is:

1. An attached body attachably and detachably attached to a mobile communication terminal main body, comprising:
   an attached body storage unit which stores an attached body identification number identifying said attached body, content data, and access information showing an access destination of auxiliary information to utilize said content data in said mobile communication terminal; and
   an attached body communication unit which transmits said attached body identification number, said access information, and said content data to said mobile communication terminal main body in accordance with demands from said mobile communication terminal main body; and
   a first magnetic unit which is positioned on a surface of said attached body so as to contact a second magnetic unit positioned on a surface of said mobile communication terminal main body,
   wherein a magnetic field obtained by way of said first magnetic unit contacting said second magnetic unit is detected to thereby determine that said attached body is attached to said mobile communication terminal main body and to thereby start the demands from said mobile communication terminal main body to said attached body storage unit.

2. The attached body according to claim 1, wherein said contents are encrypted contents and said auxiliary information is a decryption key for decrypting said encrypted contents.

3. The attached body according to claim 1, wherein said attached body storage unit and said attached body communication unit are mounted on a non-contact IC.

4. A mobile communication terminal in which an attached body with built-in contents is attachably and detachably attached to a main body: said attached body comprising:
   an attached body storage unit which stores an attached body identification number identifying said attached body, content data, and access information showing an access destination of auxiliary information for utilizing said content data in said mobile communication terminal;
   an attached body communication unit which transmits said attached body identification number, said access information, and said content data to said mobile communication terminal main body in accordance with the demands from said mobile communication terminal main body; and
   a first magnetic unit which is positioned on a surface of said attached body; and
   said main body comprising:
   an attached body access unit which, when said attached body is attached, reads said attached body identification number, said content data, and said access information from said attached body;
   a content utilizing unit which acquires said auxiliary information based on said access information and utilizes the contents from said attached body based on said auxiliary information; and
   a second magnetic unit which is positioned on a surface of said main body,
   wherein said first and second magnetic units are positioned so as to contact each other when said attached body is attached to said main body,
   wherein a magnetic field obtained by way of said first magnetic unit contacting said second magnetic unit is detected to thereby determine that said attached body is attached to said main body and to thereby start the demands from said mobile communication terminal main body to said attached body storage unit.

5. The mobile communication terminal according to claim 4, wherein said content utilizing unit further comprises a server access unit for accessing a management server based on said access information and acquiring said auxiliary information.

6. The mobile communication terminal according to claim 5, wherein said contents are encrypted contents and said auxiliary information is a decryption key for decrypting said encrypted contents.

7. The mobile communication terminal according to claim 4, wherein said attached body storage unit and said attached body communication unit are mounted on a non-contact IC.

8. A mobile communication system including a mobile communication terminal in which an attached body with built-in contents is attachably and detachably attached to the main body, and a management server: said attached body comprising:
  an attached body storage unit for storing an attached body identification number for identifying said attached body, content data, and access information showing an access destination of auxiliary information for utilizing said content data in said mobile communication terminal;
  an attached body communication unit for transmitting said attached body identification number, said access information, and said content data to said mobile communication terminal main body in accordance with the demands from said mobile communication terminal main body; and
  a first magnetic unit which is positioned on a surface of said attached body; and
said main body comprising:
  an attached body access unit for, when said attached body is attached, reading said attached body identification number, said content data, and said access information from said attached body;
  a content utilizing unit for acquiring said auxiliary information from said management server based on said access information and utilizing the contents from said attached body based on said auxiliary information; and
  a second magnetic unit which is positioned on a surface of said main body, and
said management server comprising:
  an attached body management table for storing a terminal identification number identifying said mobile communication terminal, said attached body identification number, and said auxiliary information corresponding thereto; and
  an auxiliary information sending unit for referring to said attached body management table based on said mobile communication terminal identification number and said attached body identification number from said content utilizing unit, judging whether or not sending of auxiliary information is possible in accordance with the reference result, and if possible, sending said auxiliary information to said content utilizing unit,
wherein said first and second magnetic units are positioned so as to contact each other when said attached body is attached to said main body,
wherein a magnetic field obtained by way of said first magnetic unit contacting said second magnetic unit is detected to thereby determine that said attached body is attached to said main body and to thereby start the demands from said mobile communication terminal main body to said attached body storage unit.

9. The mobile communication system according to claim 8, wherein said contents are encrypted contents and said auxiliary information is key information for decrypting said encrypted contents.

10. The mobile communication system according to claim 8, wherein said attached body storage unit and said attached body communication unit are mounted on a non-contact IC.

11. The management server according to claim 9, comprising a refusal information transmission processing unit for transmitting refusal information to refuse transmission of key information when said terminal identification information is not in conformity with terminal identification information already registered in said attached body management table corresponding to said attached body identification information transmitted from said main body.

12. A non-transitory computer readable recording medium storing therein a program for causing a computer to operate as a mobile communication terminal main body to which an attached body with built-in contents is attachably and detachably attached, said program comprising the steps of:
  reading an attached body identification number identifying said attached body, content data, and access information showing an access destination of auxiliary information for utilizing said content data in said mobile communication terminal from said attached body when said attached body is attached to said mobile communication terminal main body, as a first step;
  transmitting said attached body identification number, said content data, and said access information from said attached body to said mobile communication terminal main body in accordance with demands from said mobile communication terminal main body, as a second step;
  detecting an attachment of said attached body to said mobile communication terminal main body by detecting a magnetic field obtained by way of a first magnetic unit provided on a surface of said attached body contacting a second magnetic unit provided on a surface of said mobile communication terminal main body, as a third step; and
  upon the detecting, starting, by said mobile communication terminal main body, demands to said attached body to acquire said auxiliary information, as a fourth step.

13. The non-transitory recording medium according to claim 12, wherein said second step further includes a step accessing a management server based on said access information and acquiring said auxiliary information.

14. The non-transitory recording medium according to claim 12, wherein said contents are encrypted contents and said auxiliary information is a decryption key for decrypting said encrypted contents.

* * * * *